(12) United States Patent
Uefune et al.

(10) Patent No.: US 7,876,528 B2
(45) Date of Patent: Jan. 25, 2011

(54) DISK DRIVE DEVICE AND MANUFACTURING METHOD THEREOF

(75) Inventors: Kouki Uefune, Kanagawa (JP); Yoshiyuki Hirono, Kanagawa (JP); Takako Hayakawa, Kanagawa (JP); Takashi Kouno, Ibaraki (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 571 days.

(21) Appl. No.: 12/008,544

(22) Filed: Jan. 10, 2008

(65) Prior Publication Data

US 2008/0212237 A1    Sep. 4, 2008

(30) Foreign Application Priority Data

Jan. 12, 2007  (JP)  ............... 2007-004992

(51) Int. Cl.
*G11B 33/14* (2006.01)
(52) U.S. Cl. .................................... 360/97.02
(58) Field of Classification Search ............. 360/97.01, 360/97.02, 97.03, 97.04
See application file for complete search history.

(56) References Cited

U.S. PATENT DOCUMENTS

| | | | | |
|---|---|---|---|---|
| 7,062,387 B1 * | 6/2006 | Burns et al. ................... 702/51 |
| 7,355,811 B1 * | 4/2008 | Gifford et al. ............ 360/97.02 |
| 7,773,338 B2 * | 8/2010 | Hayakawa et al. ........ 360/97.02 |
| 2005/0068666 A1 | 3/2005 | Albrecht et al. |
| 2007/0268621 A1 * | 11/2007 | Bernett et al. ............ 360/97.02 |
| 2008/0007866 A1 * | 1/2008 | Hayakawa et al. ........ 360/97.02 |
| 2008/0165448 A1 * | 7/2008 | Ichikawa et al. ......... 360/97.02 |
| 2008/0310048 A1 * | 12/2008 | Hirono et al. ............ 360/97.02 |
| 2009/0168233 A1 * | 7/2009 | Kouno et al. ............. 360/97.01 |

FOREIGN PATENT DOCUMENTS

JP    2001-307458 A    11/2001

* cited by examiner

*Primary Examiner*—Allen T Cao

(57) ABSTRACT

In a disk drive device having a double cover structure with low-density gas enclosed therein, embodiments of the present invention allow a more reliable leak inspection to be performed on the second cover and to prevent defects caused by joining the secondary cover. An HDD according to an embodiment of the present invention comprises a ventilation path from a ventilation hole on an inner cover to a space between the inner cover and an outer cover. An outer peripheral end of an adhesive layer is apart from a joining section, which is exposed in the space. Helium gas flowing out of the ventilation hole flows to the space via the ventilation path and remains within the space. This enables detection of leakage of the helium gas from the joining section to be performed more easily.

11 Claims, 5 Drawing Sheets

DISK DRIVE DEVICE AND MANUFACTURING METHOD THEREOF

CROSS-REFERENCE TO RELATED APPLICATION

The instant nonprovisional patent application claims priority to Japanese Patent Application No. 2007-004992 filed Jan. 12, 2007 and which is incorporated by reference in its entirety herein for all purposes.

BACKGROUND OF THE INVENTION

Nowadays, hard disk drives (hereinbelow, referred to as HDDs) rotate magnetic disks and drive head gimbal assemblies (hereinbelow, referred to as HGAs) at high speed in response to requests for huge capacity, high recording density, and high-speed accessing. These cause fluctuation of air (turbulence) to buffet the magnetic disks and HGAs. This turbulence buffeting can be a disturbance for positioning heads for data which are recorded with high-density on a magnetic disk. This is because the turbulence occurs at random and it is difficult to estimate its magnitude and cycle so that swift and accurate positioning control will be complex and difficult. Also the turbulence buffeting may cause a noise to impair the quietness of the device.

Another problem caused by influence of the air within the device due to the high-speed rotation other than the foregoing is increase of electric power consumption. When the magnetic disk is rotated at high-speed, the air around the disk is dragged and rotated together. On the other hand, the air apart from the magnetic disk remains still so that shearing force arises therebetween to become a load against the rotation of the disk. This is called as a windage loss, which becomes larger as the disk rotates at higher speed. In order to rotate the disk at high-speed against the windage loss, a motor will require a larger output and electric power.

Focusing on that the above-described turbulence and windage loss are proportional to the density of the gas within the device, there is an idea to reduce the turbulence and windage loss by enclosing low-density gas instead of air in a hermetically-sealed HDD. Hydrogen, helium, or the like is exemplified as the lower-density gas than air, but helium is optimum because it is effective, stable, and safe in considering actual use. HDDs with sealed helium gas can solve the above-described problems and realize swift and accurate positioning control, electric power saving, and satisfactory quietness.

However, molecules of helium are so small and a diffusion coefficient of helium is large. Therefore, there has been a problem that enclosures used for usual HDDs are poorly sealed so that helium gas leaks easily during normal use. In order to make it possible to hermetically seal low-density gas such as helium gas, for example, a technique disclosed in U.S. Patent Application Publication No. 2005/0068666 ("Patent Document 1") has been suggested.

Specifically, since helium gas escapes easily as described above, welding or solder jointing is considered as appropriate for sealing an HDD. If an HDD is determined that it is defective at an inspection after assembled, parts in the HDD are replaced to repair the HDD. In order to perform this repair easily, it is desirable not to weld or solder joint until the inspection is completed after helium gas has been sealed.

The above-described Patent Document 1 discloses a method for sealing the HDD with doubled covers as one approach to solve this dilemma. This method seals the HDD, until the end of the inspection step, with a primary cover having a low helium-gas-permeable gasket which can be easily disassembled and replaced. Then, after passing the inspection, it attaches a secondary cover and seals the HDD by welding or soldering the second cover. Thus, utilizing a double cover structure enables to hermetically seal the HDD with helium gas enclosed therein and to disassemble and replace the components easily after the inspection.

On this occasion, in order to inhibit the helium gas from leaking from the finished HDD, the welded or soldered sealing section of the secondary cover should be inspected and confirmed that the helium gas is not leaking. However, if the above-described double cover structure is adopted, since a certain level of sealing property is secured by the primary cover, leakage may not be able to be detected at a detection step notwithstanding presence of a leak hole at the sealing section of the secondary cover.

Then, in order to assure the leak inspection on the secondary cover, a ventilation hole may be provided on the primary cover to flow out a certain quantity of helium gas therethrough. However, if merely the ventilation hole on the primary cover is provided, large amount of helium gas leaks at the time of fixing the secondary cover so that necessary helium gas may not be left in the HDD.

Besides, in the fixing step of the secondary cover by welding or soldering, dust and gas may be generated. Especially, generation of gas in welding will be a problem. If these dust and gas enter the interior space where a magnetic disk and the other components are placed, reliability in a head-disk interface will be reduced. Therefore, it is important to prevent the dust and gas from entering the interior space through the ventilation hole in joining.

BRIEF SUMMARY OF THE INVENTION

Embodiments of the present invention relate to a disk drive device having a double cover structure with low-density gas enclosed therein, to perform a more reliable leak inspection on the second cover, and to prevent defects caused by joining the secondary cover. As shown FIG. 3, hard disk drive (HDD) 1 according to an embodiment of the present invention comprises a ventilation path 223 from a ventilation hole on an inner cover 201 to a space between the inner cover 201 and an outer cover 401. An outer peripheral end of an adhesive layer 301 is apart from a joining section 411, which is exposed in the space 224. Helium gas flowing out of the ventilation hole 221 flows to the space 224 via the ventilation path 223 and remains within the space 224. This enables detection of leakage of the helium gas from the joining section 411 to be performed more easily.

DETAILED DESCRIPTION OF THE INVENTION

Figure 1:
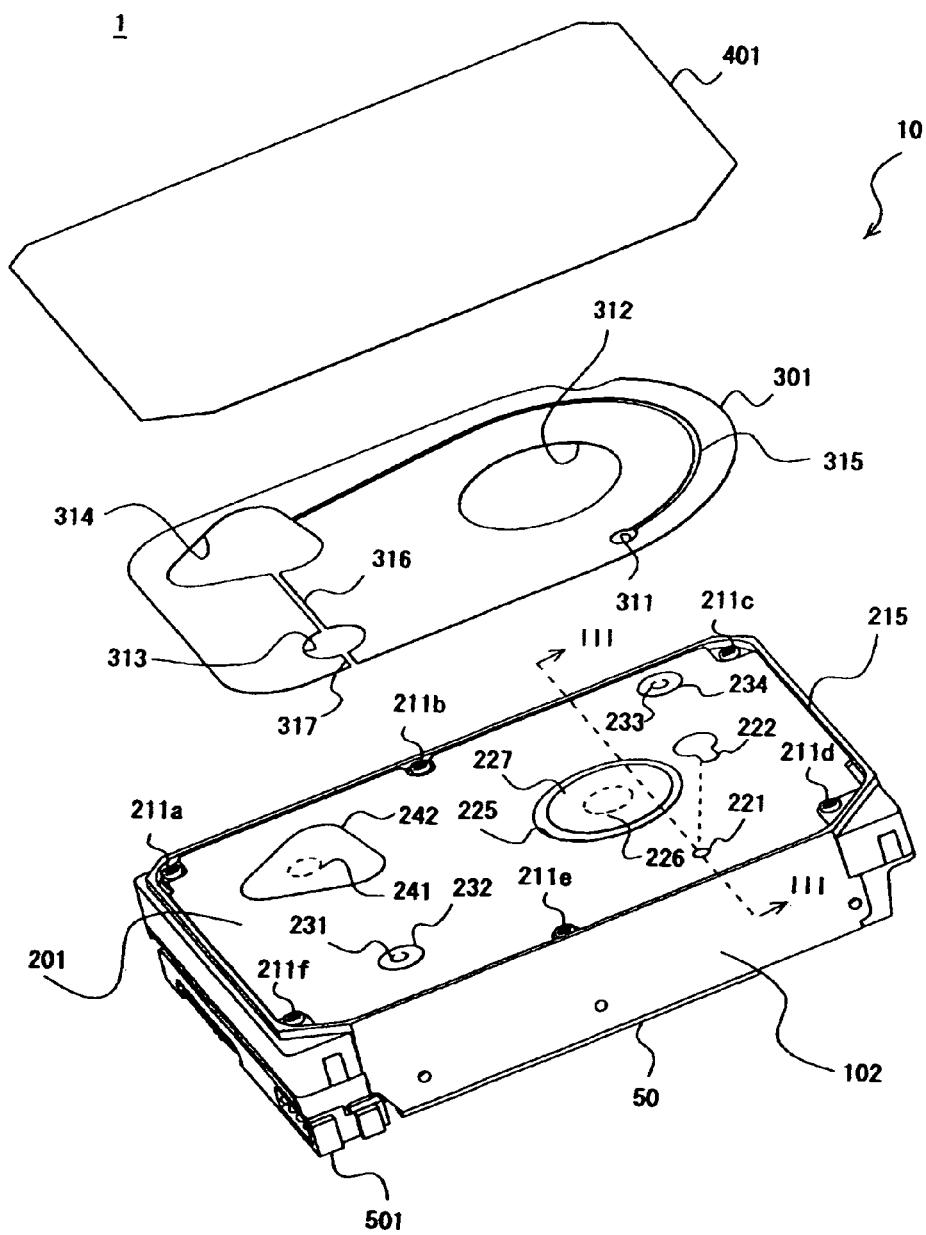
FIG. 1 is an exploded perspective view schematically showing the configuration of the hermetically-sealed HDD according to an embodiment of the present embodiment.

Embodiments in accordance with the present invention relate to a disk drive device and a manufacturing method thereof, more particularly to a hermetically-sealed disk drive device suitable for sealing low-density gas, such as helium gas, within the device and a manufacturing method thereof.

A disk drive device according an aspect of the present invention comprises a disk, a motor for rotating the disk, a head for accessing the disk, a moving mechanism for supporting and moving the head, and an enclosure for housing the disk, the motor, the head, and the moving mechanism and enclosing lower-density gas than air. The enclosure comprises a base, a primary cover fixed to the base and having a hole through which the gas flows, a secondary cover placed to cover the primary cover, a joining section for joining the base and the secondary cover to seal an inside of the enclosure including the primary cover, and a wall for defining a path extending from the hole to a space where the joining section is exposed between the primary cover and the secondary cover. The ventilation hole enables more reliable leak inspection on a secondary cover and the path reduces defects caused by joining the secondary cover. In this instance, the path preferably has a curved part. This achieves to prevent gas or dust generated in joining the secondary cover from entering into the interior space more reliably.

The enclosure may further comprise an adhesive layer for adhering the primary cover and the secondary cover between the primary cover and the secondary cover, and a part of the adhesive layer forms the wall. This improves the strength of the primary cover and the secondary cover and provides a path.

A part of the adhesive layer may define a space for housing a projected part on the primary cover, and the space for housing the projected part forms a part of the path. Or, a part of the adhesive layer may define a space for housing a sealing adhesive member (label) on the primary cover, and the space for housing the sealing adhesive member (label) forms a part of the path. This prevents the adhesive area of the adhesive layer from being small.

A method of manufacturing a disk drive device according another embodiment of the present invention arranges a disk, a motor for rotating the disk, a head for accessing the disk, and a moving mechanism for supporting and moving the head in a base. The method fixes a primary cover to the base and forms an enclosure for housing the disk, the motor, the head, and the moving mechanism. Lower-density gas than air fill in the enclosure. A secondary cover is arranged to cover the primary cover. A joining section is formed by joining the arranged secondary cover to the base and seals an inside of the enclosure including the primary cover, and further forms a path extending from a ventilation hole on the primary cover to a space where the joining section is exposed. Leakage of the gas from the joining section is checked. The primary cover having the ventilation hole enables more reliable leak inspection on a secondary cover and the path reduces defects caused by joining the secondary cover.

The lower-density gas than air may be helium gas, and welding a periphery of the arranged secondary cover joins the secondary cover to the base to form the joining section. Helium gas is effective, stable, and safe as low-density gas. Welding achieves a secure and effective joining and the present invention prevents gas generated by welding from entering the interior space.

According to embodiments of the present invention, in a disk drive device with low-density gas sealed in and having a double cover structure, more reliable leak inspection on a secondary cover can be performed, and defects caused by joining the secondary cover can be reduced.

Hereinafter, an embodiment of the present invention is described. For clearness of explanation, the following description and the accompanying drawings contain omissions and simplifications as appropriate. Throughout the drawings, the like components are denoted by like reference numerals, and their repetitive description is omitted if not necessary for the sake of clearness. In the present embodiment, a hard disk drive (HDD) is described as an example of a disk drive device.

FIG. 1 is an exploded perspective view schematically illustrating the configuration of the hermetically-sealed HDD 1 according to the present embodiment. The HDD 1 comprises a head disk assembly (referred to as HDA hereinbelow) 10 and a control circuit board 50 fixed to the outer bottom surface of the HDA 10. The control circuit board 50 has an interface connector 501 to an external host. The HDA 10 has a base 102, an inner cover 201 as a primary cover, an adhesive layer 301, and an outer cover 401 as a secondary cover. These are main parts of an enclosure. The inner cover 201 is fixed to the base 102 with screws 211a to 211f with a gasket (not shown in FIG. 1) interposed therebetween and components constituting a part of the HDA 10 are housed in an interior space formed by the base 102 and the inner cover 201.

Figure 2:
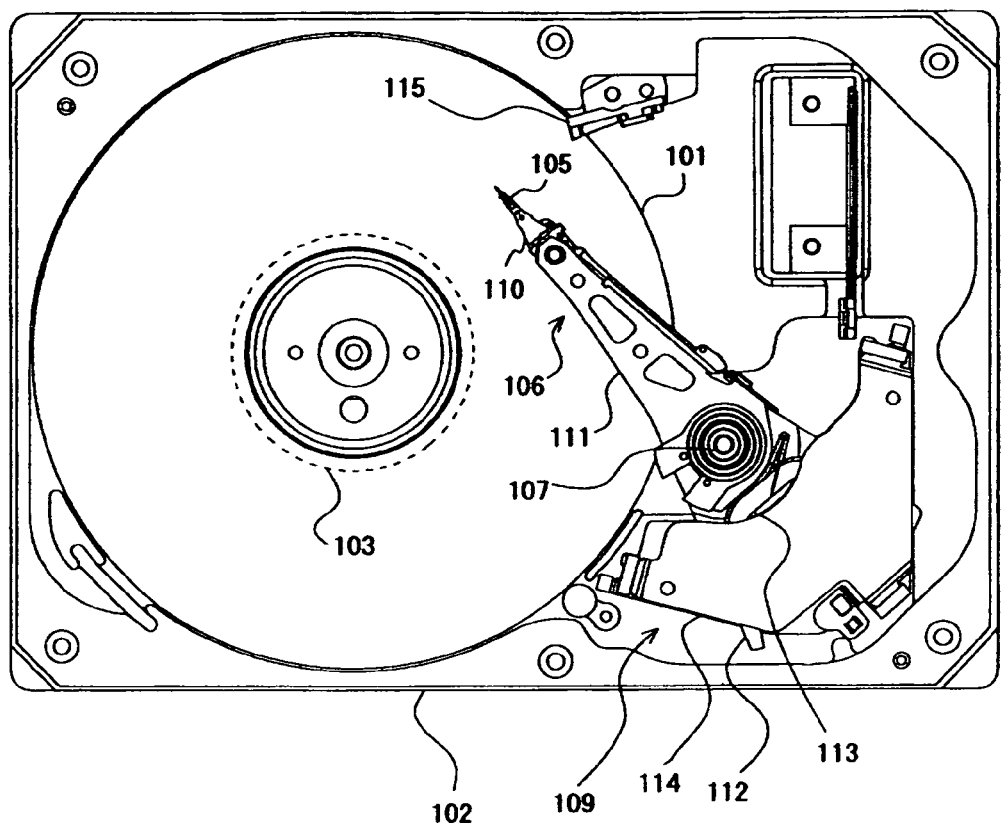
FIG. 2 is a top view of the HDD according to an embodiment of the present embodiment with the cover removed from the enclosure.

Before describing the respective components shown in FIG. 1, the configuration within the interior space formed by the inner cover 201 and the base 102 will be described referring to FIG. 2. Operation of the respective components in the interior space is controlled by the control circuit on the control circuit board 50. FIG. 2 is a top view of the hermetically-sealed-HDD 1 with the inner cover 201 and the outer cover 401 removed from the enclosure. The respective components of the HDD 1 are housed in the base 102. The HDD 1 comprises a magnetic disk 101 which is a disk for recording data. The magnetic disk 101 is a non-volatile medium for recording data with its magnetic layer magnetized.

A head slider 105 comprises a head element portion for reading and/or writing from and/or to the magnetic disk 101 with respect to data input and/or output from and/or to an external host (not shown) and a slider a surface on which the head element portion is formed. The head element portion includes a recording element for converting electric signals to magnetic fields in accordance with data to be stored on the magnetic disk 101 and/or a reproducing element for converting magnetic fields from the magnetic disk 101 to electric signals.

The actuator 106 supports and moves the head slider 105. The actuator 106 is supported pivotably about a pivotal axis 107 and is driven by a voice coil motor (hereinbelow referred to as VCM) 109 as a driving mechanism. An assembly of the actuator 106 and the VCM 109 is a moving mechanism of the head slider 105.

The actuator 106 comprises respective components of a suspension 110, an arm 111, a coil support 112 and a flat coil 113 connected in order from the tip end of the head slider 105 in a longitudinal direction where the head slider is placed. The VCM 109 is constituted by a flat coil 113, a stator magnet (not shown) fixed to a stator magnet support plate 114, and so on. A head gimbal assembly (hereinbelow referred to as HGA) is constituted by a suspension 110 and the head slider 105.

The magnetic disk 101 is supported by a spindle motor (hereinbelow referred to as SPM) 103 fixed to the base 102 and is rotated by the SPM 103 at a predetermined angular rate. The actuator 106 moves the head slider 105 over a data region on the surface of the rotating magnetic disk 101 for reading/writing data from and to the magnetic disk 101. The pressure by air viscosity between the air bearing surface (ABS) of the slider facing the magnetic disk 101 and the rotating magnetic disk 101 balances to a pressure applied toward the magnetic disk 101 by the suspension 110 for the head slider 105 to fly over the magnetic disk 101 with a certain gap.

When the magnetic disk 101 stops rotating, for example, the actuator 106 retracts the head slider 105 from above the data region to a ramp 115. The present invention can be applied to a contact start and stop (CSS) scheme in which the head slider 105 is retracted to a zone provided in an inner periphery of the magnetic disk 101 when it does not write or read data. For the sake of simplicity, the above-described HDD is a type that the number of the magnetic disk 101 is one and the storage surface is one side, but the HDD 1 may be equipped with one or more magnetic disks with the both sides of storage surfaces.

Returning to FIG. 1, the enclosure of the HDA 10 of the present embodiment has a base 102 for housing the above-described components, an inner cover 201 for closing a top opening of the base 102, an outer cover 401 placed so as to cover the inner cover 201, and an adhesive layer 301 interposed between the inner cover 201 and the outer cover 401 and adhering them. The outline of the adhesive layer 301 of the present embodiment is smaller than the outlines of the outer cover 401 and the inner cover 201.

In the HDD 1 of the present embodiment, low-density gas which has lower density than air is enclosed in the interior space. This suppresses turbulence and windage loss caused by the rotation of the magnetic disk 101 or the pivot of the actuator 106. Although hydrogen or helium is considered as the low-density gas to be used, helium is optimum because it is much effective, stable, and safe. Hereinbelow, a case using helium is described by way of example. The HDD 1 includes the removable inner cover 201 and the outer cover 401 for preventing leakage of the helium gas so that rework in the manufacturing process becomes easy and leakage of the helium gas from the HDD 1 as a finished product can be effectively prevented.

In manufacturing the HDD 1, first, the head slider 105 is fabricated. Aside from the head slider 105, the suspension 110 is fabricated. The head slider 105 is fixed to the suspension 110 to fabricate an HGA. Then, the arm 111 and the VCM coil are fixed to the HGA to fabricate a head stack assembly (HSA) which is an assembly of the actuator 106 and the head slider 105.

Figure 3:
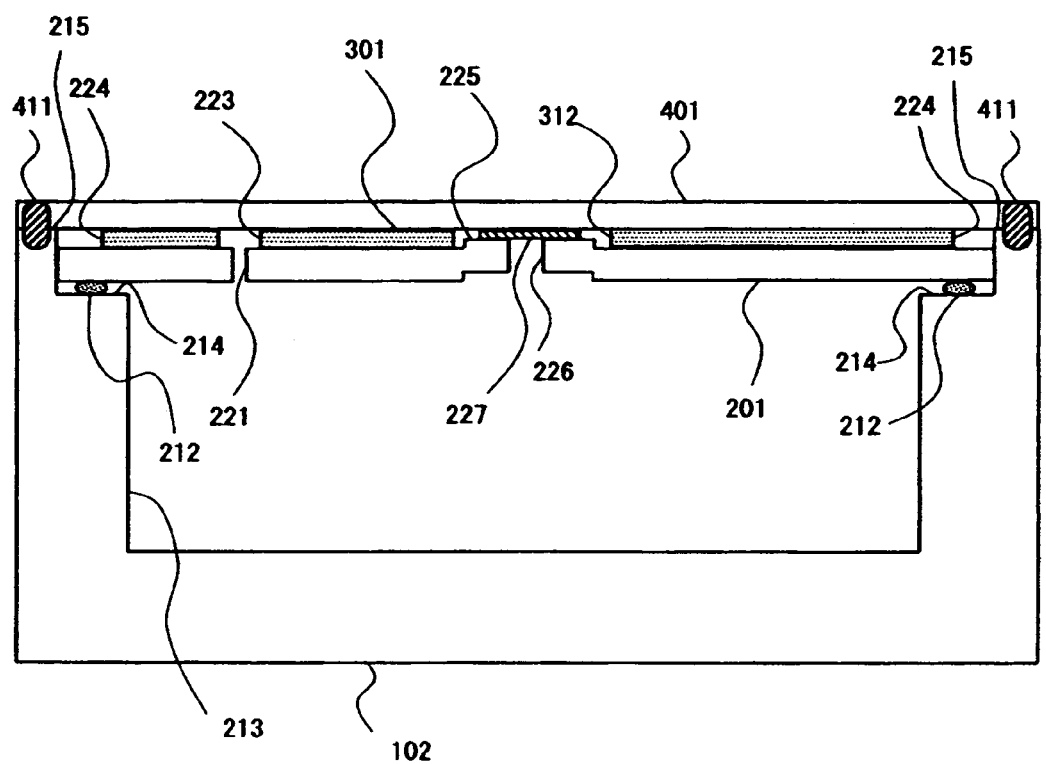
FIG. 3 is a cross-sectional view along the III-III line of FIG. 1 and corresponds to a cross-sectional view of the assembled HDA.

In addition to the fabricated HSA, the SPM 103, the magnetic disk 101, and the like are mounted within the base 102, and then the inner cover 201 is fixed to the base 102 with screws 211a to 211f. As shown in FIG. 3, between the inner cover 201 and the base 102, a gasket 212 which is a belt-shaped sealing material made of elastic body such as fluororubber is provided. FIG. 3 is a cross-sectional view along the III-III cutting-line of the FIG. 1 and corresponds to a cross-sectional view of the assembled HDA 10. Here, the respective components in the interior space 213 and the control circuit board are omitted.

The inner cover 201 is formed by a plate made of such as stainless steel, aluminum, brass, or the like. The gasket 212 is provided around the entire periphery of the part where the inner cover 201 touches a flange 214 and is configured so as to seal in helium gas tentatively. The gasket 212 is typically fixed to the inner cover 201 and pushed and pressed by the inner cover 201 against the flange 214 which is a tier of the side wall of the base 102.

The inner cover 201 with the gasket 212 fixed is placed down onto the flange 214 and is tentatively joined with the screws 211a to 211f, then helium gas is enclosed into the interior space 213 formed by the inner cover 301 and the base 102. The control circuit board 50 is implemented in the state that the helium gas has been enclosed and an operation inspection on the HDD 1 is performed before the outer cover 401 is fixed. Thus, in the inspection process, the outer cover 401 and the adhesive layer 301 have not been mounted yet.

The inspection step inspects whether or not there is a defective part which cannot clear the required specification and performance level. If it detects a defective part, it returns the device to the assembling step, removes the once attached inner cover 201, and performs repair work (rework) to replace only the defective part. The inner cover 201 is merely fixed with the screws 211a to 211f and can be removed easily so that the rework process will not be disturbed.

The device which has cleared the required specification and performance level in the inspection step is moved to the assembling process again and the adhesive layer 301 and the outer cover 401 are mounted thereon. On this occasion, the section where the helium gas in the enclosure is likely to leak is the joint section of the base 102 and the outer cover 401. In order to hermetically seal the particular section, at the joining section 411 in FIG. 3, the upper part 215 of the side wall of the base 102 and the outer cover 401 shown in FIGS. 1 and 3 are laser-welded or solder jointed. Although dust and gas are generated in joining, the gasket 212 prevents these from entering the interior space 213 from between the outer peripheral end of the inner cover 201 and the base 102.

As shown in FIG. 1, the upper part 215 of the side wall of the base 102 surrounds the entire outer periphery of the flange 214. FIG. 3 shows an example of joining by welding. The joining section 411 of the outer cover 401 and the base 102 is provided along the entire peripheries of the upper opening of the base 102 and the inner cover 201 so as to surround them. The joining section 411 hermetically seals the inner cover 201 and the interior space 213. The joining section 411 is a sealing section to form this hermetically-sealed space.

In laser-welding or solder jointing, the materials of the base 102 and the outer cover 401 should be selected in view of their durability, reliability, and cost. For example, either set of the base 102 formed by aluminum die-casting and the aluminum outer cover 401 formed by pressing or cutting, or the base 102 formed by cold forging from an aluminum alloy whose contents of copper and magnesium are relatively small and the aluminum outer cover 401 formed by pressing or cutting is preferably selected.

As described above, performing the inspection in a state that the helium gas is temporarily sealed in by use of the inner cover 201 makes the rework easy. Additionally, the above-described complete joining of the outer cover 401 for hermetically sealing the device after passing the inspection step or after passing the re-inspection step following the repair work can prevent leakage of the helium gas.

In the manufacturing step of the HDD 1, an inspection for leakage of helium gas from the joining section 411 of the outer cover 401 and the base 102 is performed. In the leak inspection, a helium gas detector is used. However, since a certain sealing property is secured by means of the gasket 214 and the inner cover 201, leakage of the helium gas may not be detected in the inspection step regardless of presence of joining defect at the joining section 411.

As shown in FIGS. 1 and 3, the inner cover 201 of the present embodiment has a ventilation hole 221 to be a ventilation path for helium gas. This enables the leak inspection at the joining section 411 to be more reliable. As shown in FIG. 1, the ventilation hole 221 is sealed by a sealing label 222 before the outer cover 401 is mounted. This prevents much of the helium gas in the interior space 213, from decreasing after the inner cover 201 is mounted until the outer cover 401 is mounted. The sealing label 222 is removed after the operation inspection step has been finished and before the outer cover 401 is mounted.

The helium gas in the interior space 213 escapes through the ventilation hole 221 into the space between the outer cover 401 and the inner cover 201. If a leak hole exists at the joining section 411 of the outer cover 401 and the base 102, this helium gas leaks through the leak hole at the joining section 411 so that the detector can more readily detect the leakage.

The HDD 1 of the present embodiment has an adhesive layer 301 having a specific shape which adheres the outer cover 401 and the inner cover 201. The outer cover 401 is generally formed thin because it is fixed by welding or the enclosure size is determined by a regulation so that its strength is small. Thereby, the adhesive layer 301 for adhering and fixing the outer cover 401 to the inner cover 201 can reinforce the outer cover 401. An adhesive tape as the adhesive layer 301 is preliminarily adhered to the outer cover 401 and a cover label is attached thereon. The cover label is removed when the outer cover 401 is joined to the base 102 so that the efficiency in the assembling work is improved.

As shown in FIG. 3, as a feature of the present embodiment, the HDD 1 has a ventilation path 223 from the ventilation hole 221 of the inner cover 201 toward the space 224 between the inner cover 201 and the outer cover 401. The outer peripheral end of the adhesive layer 301 is apart from the joining section 411 and the joining section 411 is exposed in the space 224. The helium gas flows from through the ventilation hole 221 into the space 224 via the ventilation path 223 and remains in the space 224. A part of the adhesive layer 301 becomes both side walls of the ventilation path 223 and a part of the inner cover 201 and a part of the outer cover 401 become a top wall and a bottom wall of the ventilation path respectively. Also, the outer end of the adhesive layer 301 and the inner end of the joining part 411 becomes side walls of the helium remaining space 224 and a part of the inner cover 201 and a part of the outer cover 401 become a top wall and a bottom wall of the helium remaining space 224 respectively.

As shown in FIG. 1, the adhesive layer 301 has a plurality of large sized openings 311, 312, 313, and 314, and moreover, connection openings 315, 316, and 317 for connecting these openings or connecting the opening and the outer end of the adhesive layer 301. The connection opening 315 connects the openings 311 and 3142; the connection opening 316 connects the openings 314 and 313; and the connection opening 317 connects the opening 313 and the outer space of the adhesive layer 303. These openings and connection openings comprise the ventilation path 223. The opening 311 is located at the position corresponding to the ventilation hole 221, which is exposed through the opening 311.

The location of the opening 312 corresponds to the one of the SPM 103. As shown in FIGS. 1 and 3, the inner cover 201 has a projected part 225 at the position facing the SPM 103. Moreover, on the projected part 225, a hole 226 for the screw for fixing the SPM 103 to fit is formed. A sealing label 227 seals the hole 226. In FIG. 3, the screw to fit the hole 226 is omitted. The projected part 225 corresponds to a depressed part in the interior space 213 and is made for the inner cover not to interfere the SPM 103. The opening 312 is formed to house the projected part 225 and the sealing label 227 so that the adhesive layer 301 adheres the inner cover 201 and the outer cover 401 in a larger area.

The opening 313 is formed at the position of a helium injection hole 231 and houses a sealing label 232 which seals the helium injection hole 231. Since the sealing label 232 has a certain thickness, the adhesive layer 301 avoiding it results in increase of the adhesive area of the inner cover 201 and the outer cover 401. The inner cover 201 has another helium injection hole 233 and a sealing label 234 which seals it. When helium gas is injected, it is injected through one helium injection hole and the air is emitted through the other helium injection hole. After the injection of the helium gas into the interior space 213 has been finished, the helium injection holes 231 and 233 are sealed with the sealing labels 232 and 234, respectively. In injecting the helium gas and sealing, the helium pressure inside the inner cover is kept around 1.2 atm. This enables the helium to flow out into the outer cover easily, which will be described later.

The opening 314 is located at the position facing the pivotal axis 107 of the actuator 106 and houses a sealing label 242 which seals a screw hole 241 for the screw to fix the actuator 106. Since the sealing label 242 has a certain thickness, the adhesive layer 301 avoiding it results in increase of the adhesive area of the inner cover 201 and the outer cover 401.

Figure 4:
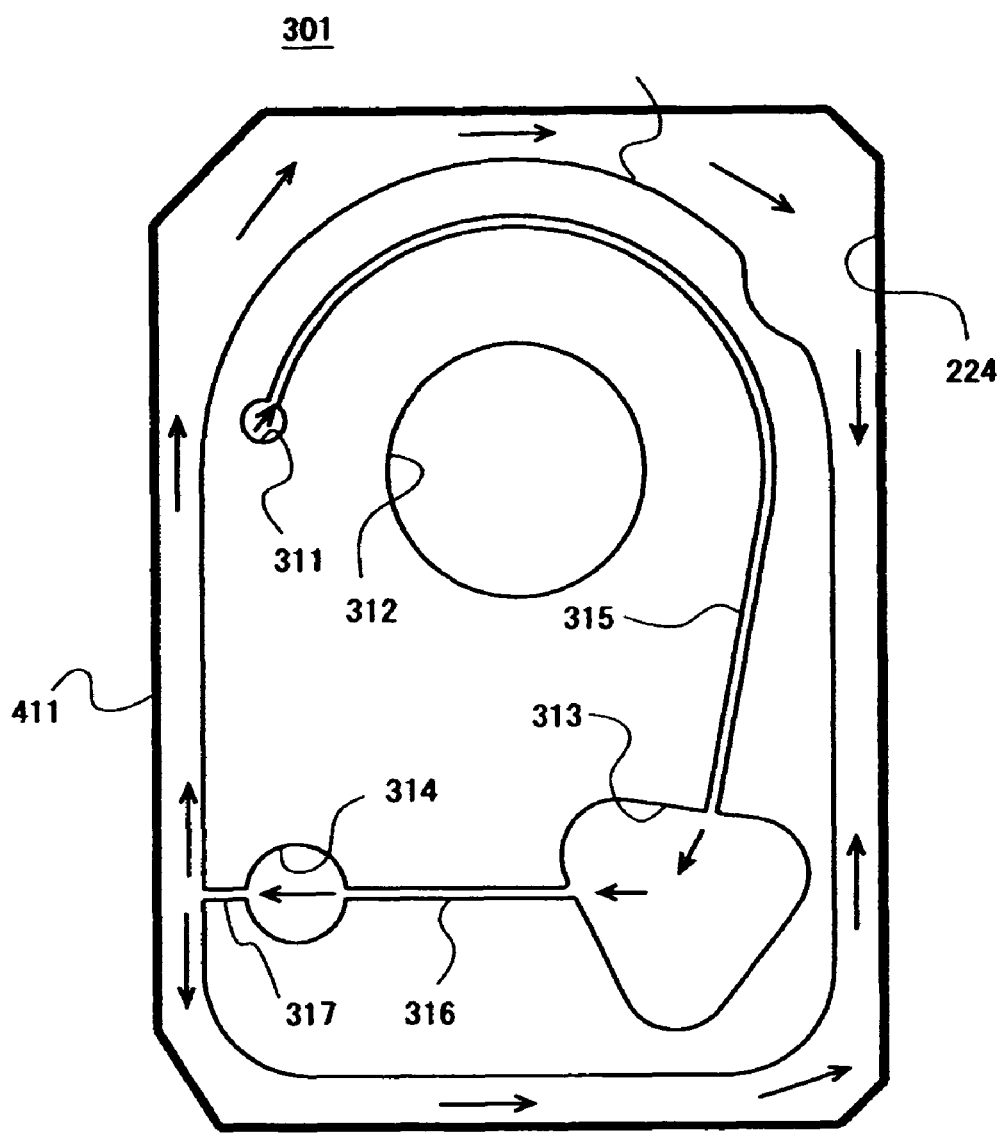
FIG. 4 is a drawing illustrating the flow of the helium gas and shows the outer cover with the adhesive layer 301 adhered as viewed from the adhesive layer side.

Now referring to FIG. 4, flow of the helium gas will be described. FIG. 4 shows the outer cover 401 with the adhesive layer 301 adhered, as viewed from the adhesive layer 301 side. In FIG. 4, the joining section 411 of the outer cover 401 and the base 102 is shown. The helium gas in the interior space 213 flows through the ventilation path 223 to reach the helium remaining space 224. The outline of the adhesive layer 301 is smaller than the shape of the inner periphery of the joining section 411 and the entire outer periphery of the adhesive layer 301 is apart from the joining section 411. Between the entire outer periphery of the adhesive layer 301 and the joining section 411, the helium remaining space 224 is formed.

The flow of the helium gas will be specifically described. The helium gas flows out of the ventilation hole 221 on the inner cover 201 to the opening 311 constituting a part of the ventilation path 223. It flows through the connection opening 315 to reach the opening 313. Further, the helium gas flows through the opening 316 to reach the opening 314, then flows through the connection opening 317 to the helium remaining space 224. Since the entire joining section 411 for sealing the inner cover 201 is exposed to the space 224, if a leak hole is present at the joining section 411 due to defective joining, the helium gas leaks to the outside through the leak hole.

As described above, the ventilation path 223 which connects the ventilation hole 221 of the inner cover 201 to the space 224 where the joining section 411 is exposed transfers the helium gas slowly to the joining section 411 so that the helium gas does not leak too much in joining the secondary cover. Besides, it prevents gas in joining from reaching the ventilation hole 221 of the inner cover 201 and entering the interior space 213.

In order to prevent the gas from entering the interior space 213, the ventilation path 223 is preferably formed as long as possible. On the other hand, since forming the ventilation path 223 longer decreases the adhesive area of the adhesive layer 301, it is important to consider this point. Thus, as described referring to FIG. 1, the openings formed to avoid the projected parts or labels on the inner cover 201 may comprise a part of the ventilation path. Utilizing the openings formed for other purposes can suppress reduction of the adhesive area. Further, since the leak amount of the helium gas from the primary cover depends on the lengths of the ventilation paths and it influences the amount of the helium gas within the device at the completion of joining the secondary cover, it is important to consider this point, too. That is, the leak amount of the helium should be controlled according to the length of the ventilation path.

In order to prevent the gas from flowing in through the ventilation hole 221 in joining, the ventilation path 223 is preferably curved. Especially, the ventilation path 223 is preferably curved over 90°. The ventilation path 223 according to the present embodiment shown in FIG. 4 is curved over 180° throughout from the ventilation hole 221 to the helium remaining space 224. Especially, the ventilation path 223 is curved over 90° to reach the connection opening 314 to effectively prevent the gas from flowing in.

Figure 5:
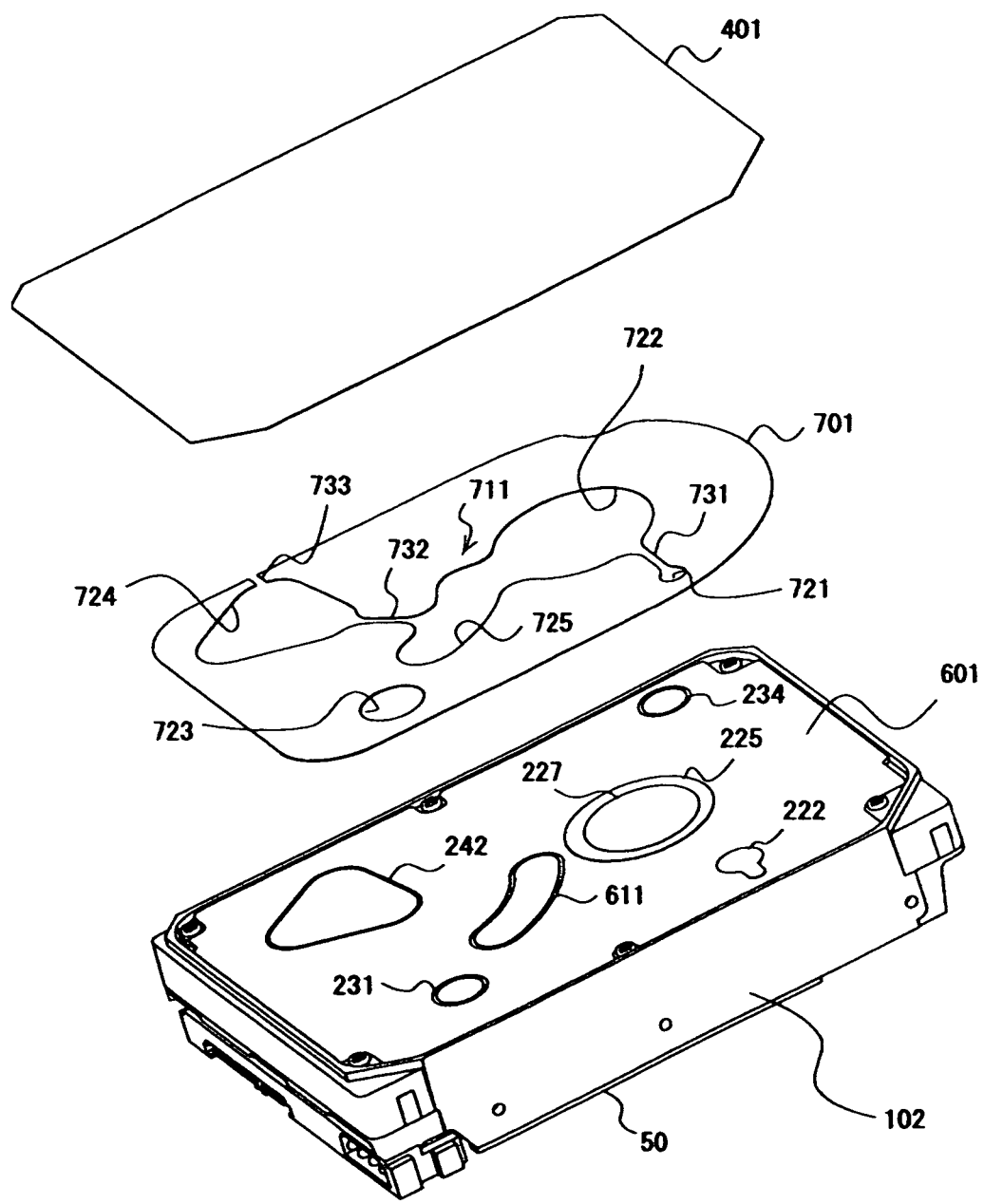
FIG. 5 is an exploded perspective view schematically showing the configuration of the hermetically-sealed HDD according to another aspect of the present embodiment which has a different shape of ventilation path from the one in the HDD shown in FIG. 1.

Next, an HDD 1 having a different-shaped ventilation path will be described referring to FIG. 5. In FIG. 5, the shapes of the inner cover 601 and the adhesive layer 701 are different from the ones in the HDD 1 shown in FIG. 1, and the configurations of the other components are the same. In FIG. 5, the inner cover 601 further has a sealing sticker 611 in addition to the configuration of the inner cover 201 shown in FIG. 1. The inner cover 601 has a hole for passing a pin for moving the actuator from the outside therethrough in servo writing and the sealing sticker 611 seals the hole.

The adhesive layer 701 has an opening for forming a different shaped path 711 from the one in the adhesive layer 301 shown in FIG. 1. The adhesive layer 701 has openings 721, 722, 723, 724, and 725, and connection openings 731, 732, and 733. The opening 721 corresponds to the opening 311 in FIG. 1, the opening 722 to the opening 312, the opening 723 to the opening 314, and the opening 724 to the opening 313. The opening 725 is formed to avoid the sealing sticker 611 and houses it therein.

The connection opening 731 connects the openings 721 and 722. The openings 725 and 722 are connected. The connection opening 732 connects the openings 724 and 725, and the connection opening 733 connects the opening 724 and the helium remaining space. The helium gas flown out of the ventilation hole 221 flows from the opening 721 to the opening 722 via the connection path 731, then flows into the opening 725. Further, the helium gas flows from the opening 725 to the opening 724 via the connection opening 732 and flows out into the helium remaining space 224 through the connection opening 733. A part of the path 711 in FIG. 5 is configured by the openings formed for the other purpose and can prevent reduction of the adhesive area of the adhesive layer 701.

As set forth above, the present invention is described by way of the illustrated embodiments but is not limited to the above embodiment. Elements of the above embodiments can be modified, added to, or converted, and remain within the scope of the present invention. For example, embodiments in accordance with the present invention are especially useful to the HDD, but may be applied to the other types of disk drive devices. The secondary cover and the base are preferably joined by means of soldering, especially by welding, but this does not eliminate other ways. The ventilation path between the primary cover and the secondary cover is preferably formed by use of an adhesive layer for adhering them, but the ventilation path may be configured by other ways. The adhesive layer may be configured by other means than an adhesive sheet and the adhesive layer may not be formed depending on the designs.

What is claimed is:

1. A disk drive device comprising:
   a disk;
   a motor for rotating the disk;
   a head for accessing the disk;
   a moving mechanism for supporting and moving the head; and
   an enclosure for housing the disk, the motor, the head, and the moving mechanism and enclosing lower-density gas than air; wherein
   the enclosure comprises:
   a base;
   a primary cover fixed to the base and having a hole through which the gas flows;
   a secondary cover placed to cover the primary cover;
   a joining section for joining the base and the secondary cover to seal an inside of the enclosure including the primary cover; and
   a wall for defining a path extending from the hole to a space where the joining section is exposed between the primary cover and the secondary cover.

2. The disk drive device according to claim 1, wherein
   the enclosure further comprises an adhesive layer for adhering the primary cover and the secondary cover between the primary cover and the secondary cover, and
   a part of the adhesive layer forms the wall.

3. The disk drive device according to claim 2, wherein
   a part of the adhesive layer defines a space for housing a projected part on the primary cover; and
   the space for housing the projected part forms a part of the path.

4. The disk drive device according to claim 2, wherein
   a part of the adhesive layer defines a space for housing a sealing adhesive member on the primary cover; and
   the space for housing the sealing adhesive member forms a part of the path.

5. The disk drive device according to claim 1, wherein the path has a curved part.

6. A method for manufacturing a disk drive device comprising:
   arranging a disk, a motor for rotating the disk, a head for accessing the disk, and a moving mechanism for supporting and moving the head in a base;
   fixing a primary cover to the base and forming an enclosure for housing the disk, the motor, the head, and the moving mechanism;
   filling lower-density gas than air in the enclosure;
   arranging a secondary cover to cover the primary cover;
   forming a joining section by joining the arranged secondary cover to the base and sealing an inside of the enclosure including the primary cover, and further forming a path extending from a ventilation hole on the primary cover to a space where the joining section is exposed; and
   checking leakage of the gas from the joining section.

7. The method for manufacturing the disk drive device according to claim 6, further comprising adhering the primary cover and the secondary cover with an adhesive layer between the primary cover and the secondary cover and forming a wall of the path by a part of the adhesive layer.

8. The method for manufacturing the disk drive device according to claim 7, wherein
   a part of the adhesive layer defines a space for housing a projected part on the primary cover; and
   the space for housing the projected part forms a part of the path.

9. The method for manufacturing the disk drive device according to claim 7, wherein a part of the adhesive layer defines a space for housing a sealing adhesive member on the primary cover; and the space for housing the sealing adhesive member forms a part of the path.

10. The method for manufacturing the disk drive device according to claim 6, wherein the path has a curved part.

11. The method for manufacturing the disk drive device according to claim 6, wherein the lower-density gas than air is helium gas; and welding a periphery of the arranged secondary cover joins the secondary cover to the base to form the joining section.

* * * * *